US005664309A

United States Patent [19]

Albrecht

[11] Patent Number: 5,664,309

[45] Date of Patent: Sep. 9, 1997

[54] SPRING-LOCK RELEASE TOOL

[76] Inventor: Martin Albrecht, 1580 Newman Ave., Lakewood, Ohio 44107

[21] Appl. No.: 595,349

[22] Filed: Feb. 1, 1996

[51] Int. Cl.[6] .................................................. B23P 19/04

[52] U.S. Cl. .............................. 29/237; 29/268; 285/39

[58] Field of Search ............................ 29/237, 267, 268, 29/227, 229, 235; 285/39, 318

[56] References Cited

U.S. PATENT DOCUMENTS

| | | | |
|---|---|---|---|
| 1,094,978 | 4/1914 | Church | 29/237 |
| 1,265,745 | 5/1918 | Carpenter | 29/267 |
| 2,555,591 | 6/1951 | Kane, Jr. | 285/122 |
| 3,157,075 | 11/1964 | Filia | 81/313 |
| 3,451,697 | 6/1969 | Bula | 285/93 |
| 3,599,310 | 8/1971 | Brownlee | 29/237 |
| 3,977,066 | 8/1976 | Sands et al. | 29/237 |
| 4,031,603 | 6/1977 | Shultz | 29/278 |
| 4,055,359 | 10/1977 | McWethy | 285/39 |
| 4,586,734 | 5/1986 | Grenier | 285/340 |
| 4,626,000 | 12/1986 | O'Leary | 285/39 |
| 4,728,076 | 3/1988 | Ganshorn et al. | 251/149.6 |
| 4,872,709 | 10/1989 | Stack | 285/39 |
| 4,927,185 | 5/1990 | McNaughton | 285/39 |
| 5,084,954 | 2/1992 | Klinger | 29/237 |
| 5,112,085 | 5/1992 | Busch et al. | 285/39 |
| 5,301,408 | 4/1994 | Berman et al. | 285/318 |
| 5,496,073 | 3/1996 | Grenier | 285/39 |

*Primary Examiner*—Robert C. Watson
*Assistant Examiner*—Thomas W. Lynch
*Attorney, Agent, or Firm*—D. Peter Hochberg; Mark Kusner

[57] ABSTRACT

A spring-lock release tool provided with double-action arms for both uncoupling a pair of tubes and separating them from each other. A first portion of the arms engageable with a floating collar member for uncoupling the tubes, and a second portion of the arms engageable with rods for separating the tubes.

17 Claims, 6 Drawing Sheets

SPRING-LOCK RELEASE TOOL

FIELD OF THE INVENTION

The present invention relates generally to a tool for releasing a pair of coupled tubes, more particularly, to a tool for uncoupling and separating a pair of tubes held together by a tubular coupling having a spring lock.

BACKGROUND OF THE INVENTION

Fluid conduits or tubes for carrying pressurized fluids (e.g., Freon) are used in many automotive, household appliances and machine tool applications. These conduits or tubes must be capable of being disconnected in order to allow for repair or replacement of components of the system. In order to facilitate initial connection and subsequent disconnection, there has been developed a class of quick-connect fittings or tube coupling devices as exemplified by the disclosure of U.S. Pat. No. 4,055,359 issued Oct. 25, 1977 to Irvin E. McWethy for "QUICK-CONNECT TUBULAR COUPLINGS."

While the quick-connect tubular couplings have been a great success and are widely used, prior art tools to facilitate disconnection of the couplings have been costly, difficult to use, and fail to separate a pair of tubes after they have been uncoupled from each other.

Frequently, due to corrosion, dirt and the like, a pair of tubes will not easily separate once they have been uncoupled. Prior art tools have failed to address this problem. While they provide a means for uncoupling the quick-connect tubular couplings described in the patent mentioned above, they fail to provide any mechanical means for separating the uncoupled pair of tubes. Instead, the burden is placed upon the automotive technician or repair person to use their own manual strength to pull apart and separate the pair of tubes. In some cases, it is virtually impossible to separate the pair of tubes. Accordingly, it may become necessary to use a torch to heat the pair of tubes in order to separate them. This can often times lead to permanent damage to the coupling or the tubes, thus necessitating their replacement.

The present invention overcomes these and other drawbacks of prior art release tools, and provides a release tool to quickly, easily and efficiently uncouple and separate a pair of tubes connected by a tubular coupling having a spring lock.

SUMMARY OF THE INVENTION

According to the present invention, there is provided a tool adapted for uncoupling and separating a first tube, having a male fitting, from a second tube, having a mating female connector, coupled together by a retaining means having a cage member and a spring member housed therein. The tool is comprised of a locking means for locking the tool to the second tube, a collar means movable relative to the locking means, for operative engagement with the spring member to uncouple the first and second tubes, a rod means movable relative to the locking means, for operative engagement with the cage member to separate the first tube from the second tube, and an arm means movable to a first position to move the floating collar means into operative engagement with the spring member, and movable to a second position to move the rod means into operative engagement with the cage member.

It is an object of the present invention to provide a release tool for uncoupling a pair of tubes held together by a tubular coupling having a spring lock.

It is another object of the present invention to provide a release tool for separating a pair of tubes held together by a tubular coupling having a spring lock.

It is still another object of the present invention to provide a release tool which can both uncouple and separate a pair of tubes held together by a tubular coupling having a spring lock.

It is yet another object of the present invention to provide a release tool which quickly, easily, and efficiently uncouples and separates a pair of tubes held together by a tubular coupling having a spring lock.

It is yet another object of the present invention to provide a release tool for uncoupling and separating a pair of tubes held together by a tubular coupling having a spring lock, wherein the tool does not damage the tubes or the tubular coupling.

It is still another object of the present invention to provide a release tool for uncoupling and separating a pair of tubes held together by a tubular coupling having a spring lock, wherein the tubular coupling has become corroded, dirty and the like.

It is another object of the present invention to provide a release tool for separating a pair of tubes held together by a tubular coupling having a spring lock, wherein manual force is not required to separate the tubes after uncoupling.

It is still another object of the present invention to provide a release tool for uncoupling and separating a pair of tubes held together by a tubular coupling having a spring lock, wherein a mechanical action is provided to separate the pair of tubes.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 10 is a perspective view of a hinged bracket of the spring-lock release tool shown in FIG. 9; and .

DETAILED DESCRIPTION OF THE PREFERRED EMBODIMENT

Figure 1:
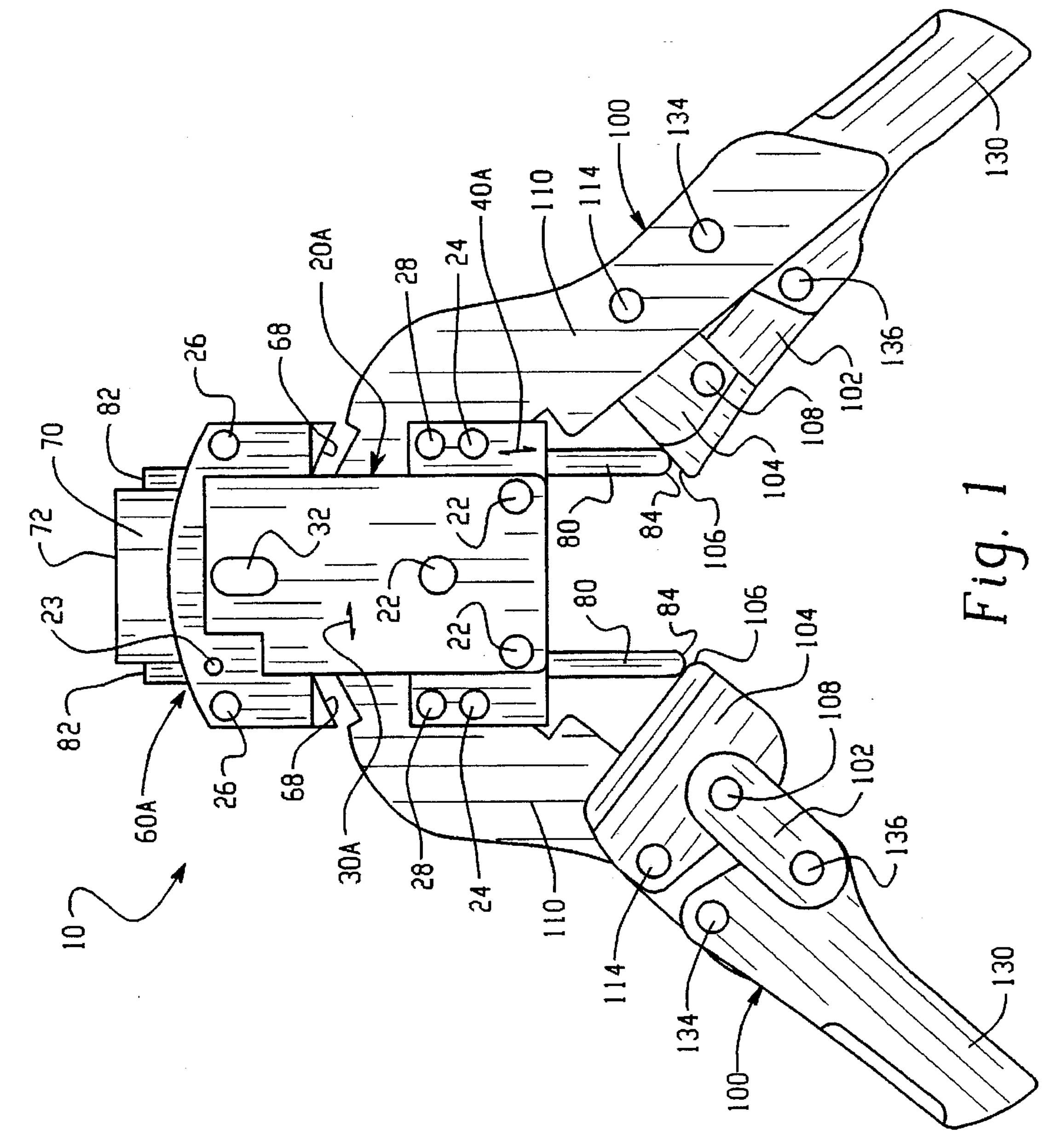
FIG. 1 is a top plan view of a spring-lock release tool illustrating a preferred embodiment of the present invention.

Referring now to the drawings, wherein the showings are for the purpose of illustrating a preferred embodiment of the invention only, and not for the purpose of limiting same, FIG. 1 shows a spring-lock release tool 10 according to the present invention. In the embodiment shown, tool 10 is generally comprised of an upper body 20A (FIGS. 1 and 3), a lower body 20B (FIG. 2) and a pair of arms 100.

Upper body 20A is generally comprised of an upper guide plate 30A, an upper locking block 40A and an upper floating collar member 60A, while lower body 20B is generally comprised of a lower guide plate 30B, a lower locking block 40B and lower floating collar member 60B. It should be appreciated that upper body 20A is mechanically the same as lower body 20B.

Upper and lower guide plates 30A and 30B will be described with reference to FIG. 1. It will be appreciated that while only upper guide plate 30A is shown, lower guide plate 30B is the same as upper guide plate 30A. Guide plates 30A, 30B are generally planar plates having a plurality of openings for receiving fasteners. Openings 22 are dimensioned to receive fasteners for attaching, respectively, guide plates 30A, 30B to upper and lower locking blocks 40A, 40B. Elongated slotted opening 32 is dimensioned to receive fasteners for attaching, respectively, upper and lower floating collar members 60A, 60B to guide plates 30A, 30B. Slotted opening 32 is elongated to allow, respectively, floating members 60A, 60B to move relative to guide plates 30A, 30B and locking blocks 40A, 40B.

It should be appreciated that while guide plates 30A, 30B and locking blocks 40A, 40B are shown as separate components, they may be integrally formed as a single component.

Figure 4:
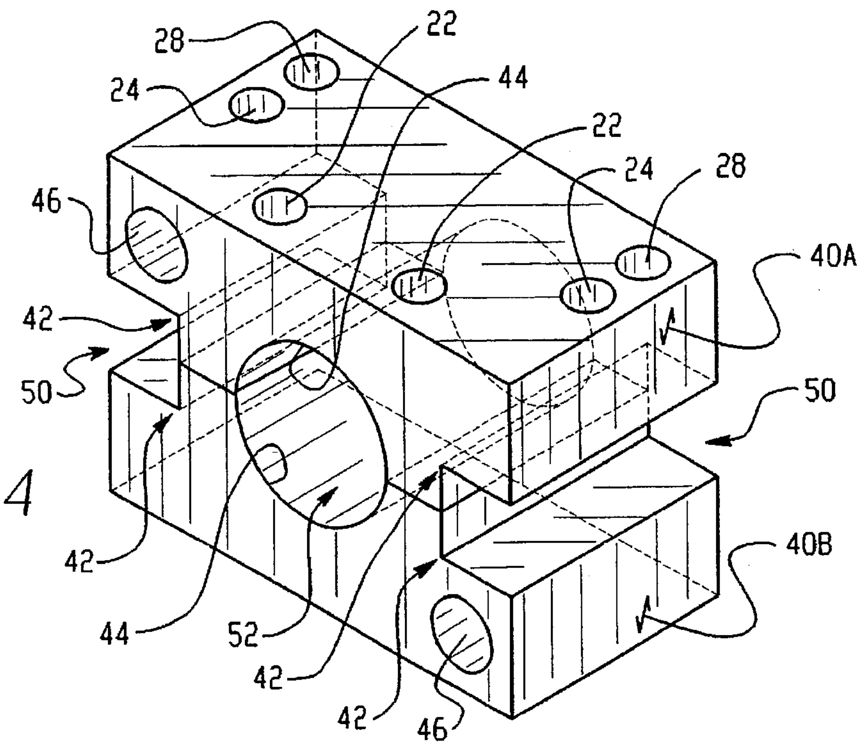
FIG. 4 is a perspective view of the upper and lower locking blocks of the spring-lock release tool shown in FIG. 1.

Upper and lower locking blocks 40A, 40B will now be described in detail with reference to FIG. 4. Locking blocks 40A, 40B are generally T-shaped blocks, generally comprising a pair of L-shaped shoulders 42, a centrally-located concave groove 44, and a bore 46. Bore 46 is dimensioned to receive a rod 80, which will be described in detail below. When upper and lower locking blocks 40A, 40B are joined together, L-shaped shoulders 42 form a pair of slots 50 and concave grooves 44 form a passageway 52. Passageway 52 is dimensioned to receive a portion of a tube, as will be discussed below. Concave grooves 44 grip the tube such that the tube is fixed relative to locking blocks 40A, 40B. Slots 50 are dimensioned to receive a portion of arms 100 as they are moved inward toward each other, as will be described in detail below.

It will be appreciated that holes 24 are formed in locking blocks 40A, 40B (FIGS. 1–3) to attach upper locking block 40A to lower locking block 40B. As indicated above, a portion of a tube will be arranged between locking blocks 40A and 40B.

Figure 3:
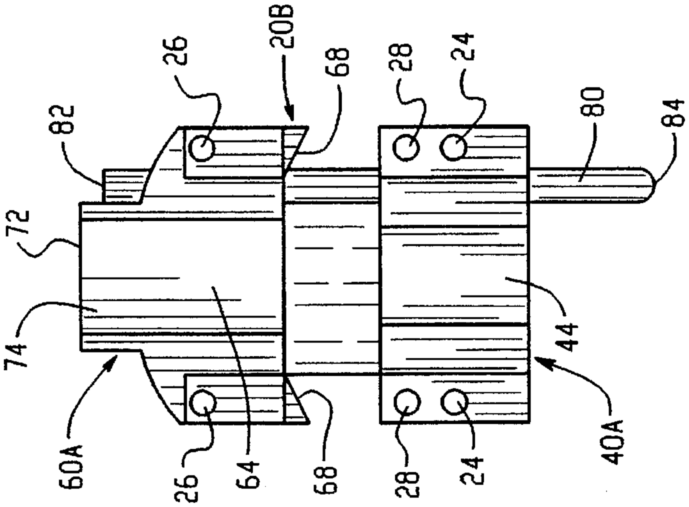
FIG. 3 is a bottom plan view of the upper body shown in FIG. 1.
Figure 2:
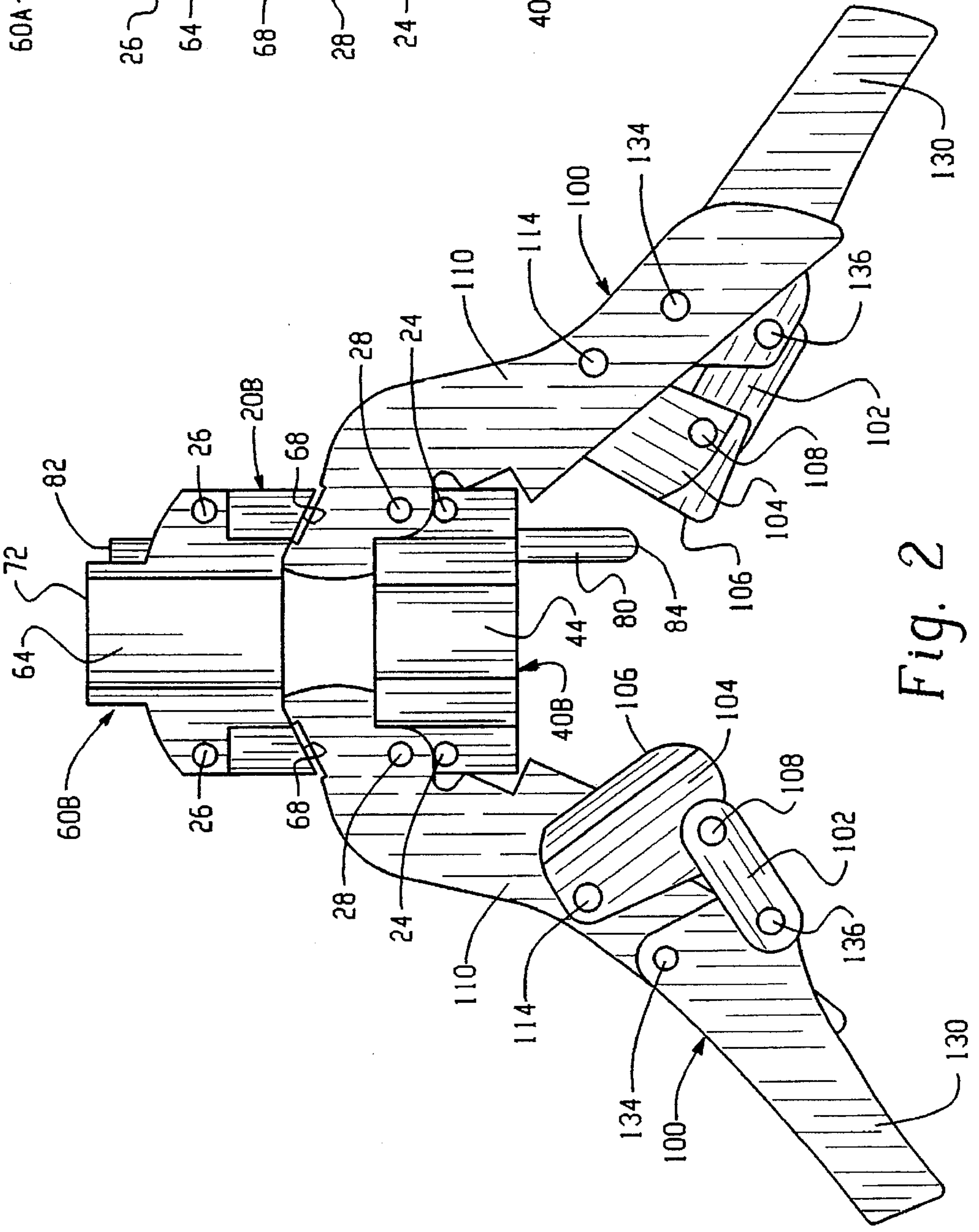
FIG. 2 is a top plan view of the spring-lock release tool shown in FIG. 1 with the upper body removed.
Figure 5:
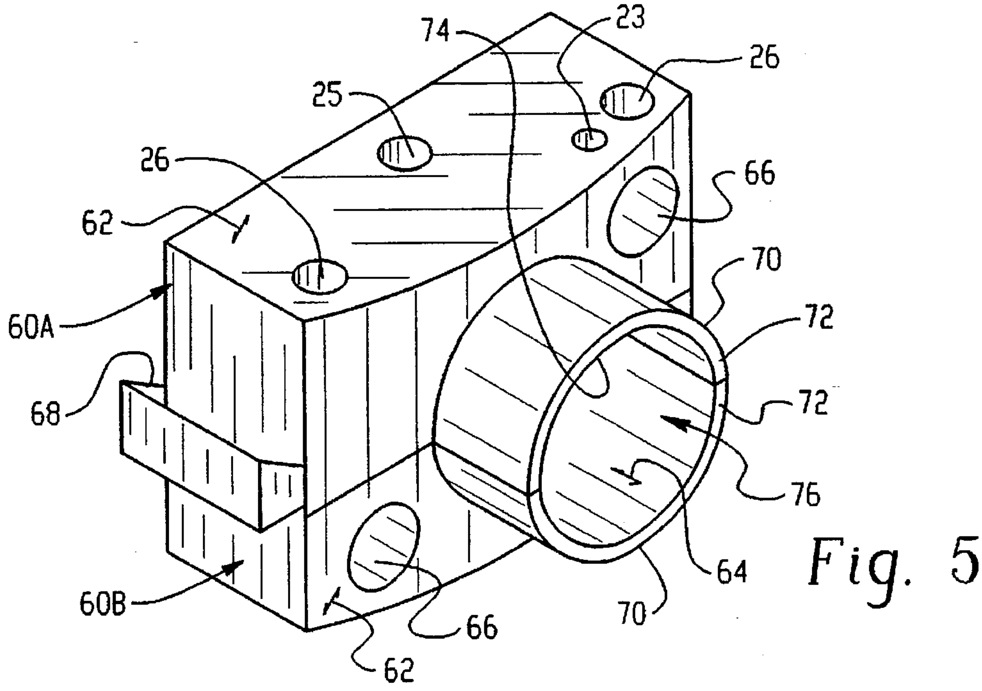
FIG. 5 is a perspective view of the upper and lower floating collar members of the spring-lock release tool shown in FIG. 1.

Upper and lower floating collar members 60A, 60B will now be described with reference to FIG. 5. Upper and lower floating collar members 60A, 60B are generally comprised of a body portion 62 and a collar portion 70. Body portion 62 is a generally rectangular-shaped block having a centrally-located concave groove 64 (FIG. 3). A bore 66 is formed generally parallel to concave groove 64, and is dimensioned to receive a rod 80, which will be described in detail below. A slanted engaging surface 68 is formed along the rear surface of body portion 62, as best seen in FIGS. 2 and 3. Engaging surfaces 68 contact with a portion of arms 100 as arms 100 are moved inward toward each other, as will be discussed in detail below.

Collar portion 70 takes the form of a half ring. The inner surface of collar portion 70 provides a concave groove 74, which is coaxial with concave groove 64. Collar portion 70 has a generally planar front face 72, which contacts with a portion of a tubular coupling 160, as will be described in detail below. Holes 26 are formed in body portion 62 to receive fasteners for connecting upper floating collar member 60A to lower floating collar member 60B. Hole 25 is formed in body portion 62 to receive fasteners for connecting, respectively, floating collar members 60A, 60B to upper and lower guide plates 30A, 30B. Hole 23 is formed to receive a set screw engageable with rod 80, as will be described in detail below.

When upper and lower floating collar members 60A, 60B are joined together, concave grooves 64, 74 form a passageway 76. Passageway 76 is dimensioned to have a diameter slightly larger than the outer diameter of a tube 190, which will be described in detail below. In addition, when collar member 60A and 60B are joined together, planar front faces 72 of collar portions 70 form an annular surface.

Figure 6:
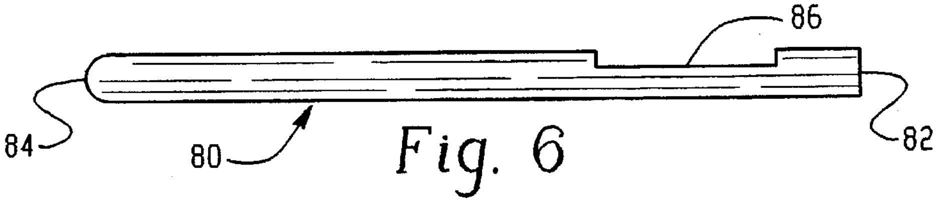
FIG. 6 is a side plan view of a rod of the spring-lock release tool shown in FIG. 1.

Referring now to FIG. 6, there is shown a side view of rods 80 which are received within bores 46 and 66 (FIGS. 1–3). Rods 80 are comprised of a front face 82, a rear face 84 and a notch 86. Notch 86 is provided to allow axial movement of rods 80, but also preventing rods 80 from falling out from bores 46 and 66. While rods 80 may move axially within bores 46 and 66 to some degree, notch 86 is used to maintain rods 80 within bores 46 and 66. In this respect, set screws located in hole 23 of floating collar members 60A, 60B are engageable with the walls of notch 86 to maintain rod 80 within bores 46 and 66.

Figure 7:
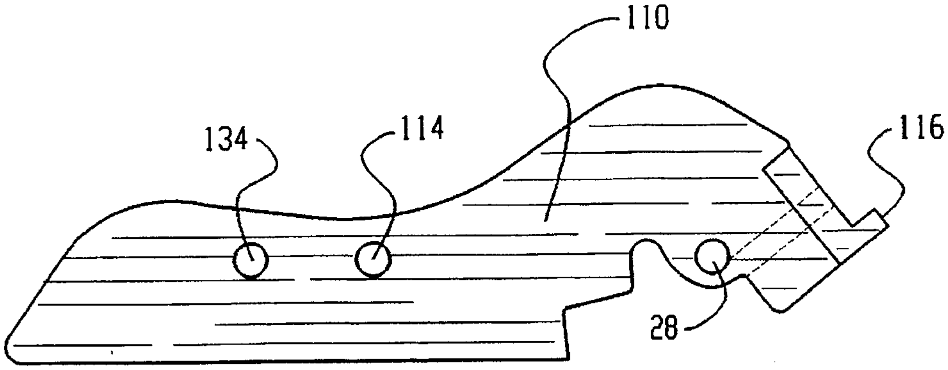
FIG. 7 is a top plan view of a primary arm of the spring-lock release tool shown in FIG. 1.

Arms 100 will now be described in detail with reference to FIGS. 1, 2 and 7. Arms 100 are generally comprised of a primary arm 110, a secondary arm 130, a link member 102, and a cam 104. Primary arm 110 is shown in detail in FIG. 7. Primary arm 110 includes an engagement surface 116, which engages with slanted engaging surface 68 of floating collar members 60A, 60B, as primary arms 110 are moved inward toward each other. It should be appreciated that engagement surface 116 is attached to primary arm 110, so that it can be properly positioned relative to engaging surface 68. Primary arms 110 also include holes 28, 114 and 134. Hole 28 is dimensioned to receive a fastener for connecting primary arm 110 to bodies 20A, 20B. Hole 114 is dimensioned to receive a fastener for connecting cam 104 to primary arm 110, and hole 134 is dimensioned to receive a fastener for connecting primary arm 110 to secondary arm 130.

Secondary arm 130 includes holes 134 and 136. Hole 134 is dimensioned to receive a fastener for connecting secondary arm 130 to primary arm 110, while hole 136 is dimensioned to receive a fastener for connecting secondary arm 130 to link member 102.

Cam 104 includes a front face 106 which operatively engages with rods 80, as secondary arms 130 are moved inward toward each other. Cam 104 also includes a hole 108 dimensioned to receive a fastener for connecting cam 104 to link member 102. Link member 102 includes a pair of holes 136 and 108. Hole 136 is dimensioned to receive a fastener for connecting link member 102 to secondary arm 130, while hole 108 is dimensioned to receive a fastener for connecting link member 102 to cam 104.

Figure 8:
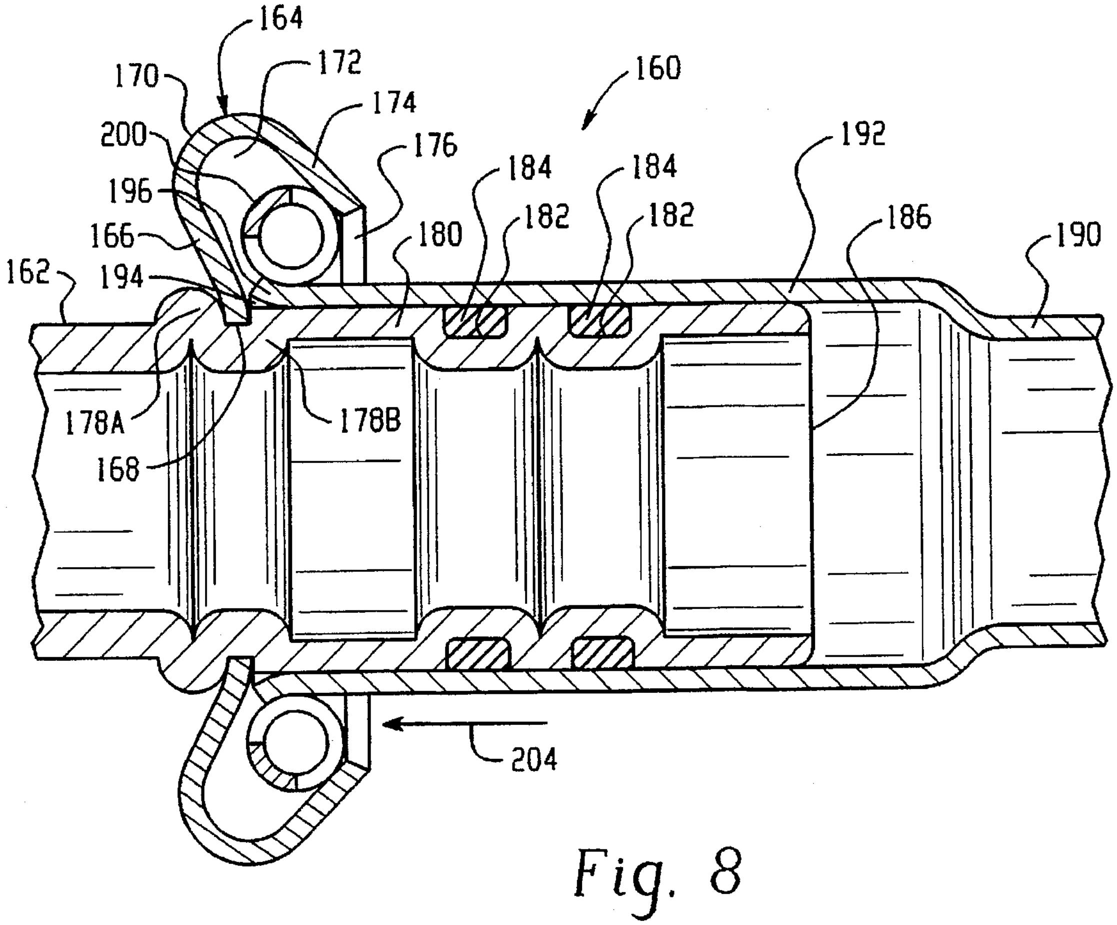
FIG. 8 is sectional assembly view of a quick-connect tubular coupling having a spring lock.

Tool 10 is used to disassemble a tubular coupling 160, such as tubular coupling 160 shown in FIG. 8. Tubular coupling 160 is generally comprised of a first tube 162 (inner tube) and a second tube 190 (outer tube). First tube 162 has a cup-shaped cage 164 externally mounted thereon. Cage 164 is positioned on tube 162. A substantially elongated end portion 180 of first tube 162 is arranged between cage 164, and free end 186 of end portion 180.

Cage 164 has a substantially radially extending base portion 166. Base portion 166 has a circular aperture 168, and a ring-like curved wall 170 open at its interior, forming an enlarged annular chamber 172. Base portion 166 has one end disposed in circular aperture 168, and an angularly inclined circular flange 174, extending toward end portion 180 in the general direction of free end 186. Flange 174 terminates in a radially-spaced relation to the surface of end portion 180 and second tube 190 to provide an access opening 176 in communication with chamber 172.

A retention means, which preferably comprises roll-formed upset beads 178A, 178B fixedly retains cage 164 against axial movement along tube 162. The upset beads 178A, 178B abut the outer and inner surfaces, respectively, of base portion 166.

End portion 180 of first tube 162 includes spaced annular grooves 182 formed in its tubular wall. Grooves 182 accommodate conventional "O" rings 184. "O" rings 184 in assembled condition of coupling 160 are compressed in a sealed mode, thus preventing leakage between first tube 162 and second tube 190.

Second tube 190 has an end portion 192, which is telescopically slidable over end portion 180 of first tube 162. Free end 194 of end portion 192 is provided with an outwardly extending flair 196. The flared end in coupling assembled condition projects through access opening 176 in cage 164 into chamber 172.

A circular spring 200 is contained within chamber 172 of cage 164. In assembled condition of coupling 160 (as shown in FIG. 8), spring 200 is interposed between flair 196 on free end 194 and the inner wall of flange 174 of cage 164. This arrangement prevents Separation of tubes 162 and 190 in a direction to cause telescopic disengagement of the two tubes. FIG. 8 shows a "locked" condition.

Tool 10 uncouples first tube 162 from second tube 190 by movement of spring 200 in the in the direction of arrow 204, and separates tube 162 from tube 190 by movement of free end 194 towards free end 186. Detailed operation of tool 10 will now be described in detail, with particular reference to FIGS. 1–3 and 8.

Upper body 20A is removed from lower body 20B, so as to expose coaxial concave grooves 44 and 64, as seen in FIG. 2. Concave grooves 44, 64 are placed around end portion 192 of second tube 190 (outer tube). Front face 72 of collar portion 70 is positioned adjacent to access opening 176. In this respect, front face 72 is located as close as possible to circular spring 200. Upper body 20A is then reattached to lower body 20B. In this respect, upper body 20A is placed around end portion 192 of second tube 190. Fasteners are placed through holes 24 and 26 to secure upper and lower bodies 20A and 20B to each other. It should be appreciated that concave grooves 44 of upper and lower locking blocks 40A, 40B are dimensioned to grip the outer surface of second tube 190, so that locking blocks 40A, 40B are fixed to second tube 190.

Tool 10 is operated in a two-step process. The first step uncouples first and second tubes 162, 190 by urging collar portions 70 of floating collar members 60A, 60B forward into engagement with spring 200. The second step separates first tube 162 from second tube 190 by urging rods 80 forward into engagement with circular flange 174.

The first step is performed by engaging primary arms 110 with upper and lower floating collar members 60A, 60B. In particular, mating engagement surfaces 116 engage with engaging surfaces 68 of floating collar members 60A, 60B by moving primary arms 110 inward toward each other. Movement of primary arms 110 towards each other causes engagement surfaces 116 to contact engaging surfaces 68, which in turn causes floating collar members 60A, 60B to move forward relative to locking blocks 40A, 40B (which are fixed to second tube 190). Front face 72, which is aligned with access opening 176, is then urged in the direction of arrow 204 which causes front face 172 to move through access opening 176 and engage with circular spring 200. Spring 200 will expand to roll up on outwardly extending flair 196 of free end 194. At this time, first tube 192 and second tube 190 will be uncoupled. It should be appreciated that primary arms 110 are movable independent of secondary arms 130.

To perform the second step of separating first tube 162 from second tube 190, secondary arms 130 are moved inward towards each other to engage front face 106 of cam 104 with rear face 84 of rods 80. Front face 106 contacts with rear face 84 of rods 80 causing rods 80 to move forward through bores 46, 66. Front face 82 of rods 80, in turn, engage with circular flange 174 to push first tube 162 away from second tube 190. Accordingly, free end 186 of first tube 162 and free end 194 of second tube 190 will move towards each other as first tubes 162 and second tubes 190 are separated from each other. It should be appreciated that one rod 80 engages the upper portion of circular flange 174, while the second rod 80 engages with the lower portion of circular flange 174 to provide a balanced force separating first tube 162 from second tube 190.

To remove tool 10 from second tube 190, upper body 20A is detached from lower body 20B by removing fasteners from holes 24 and 26.

Figure 9:
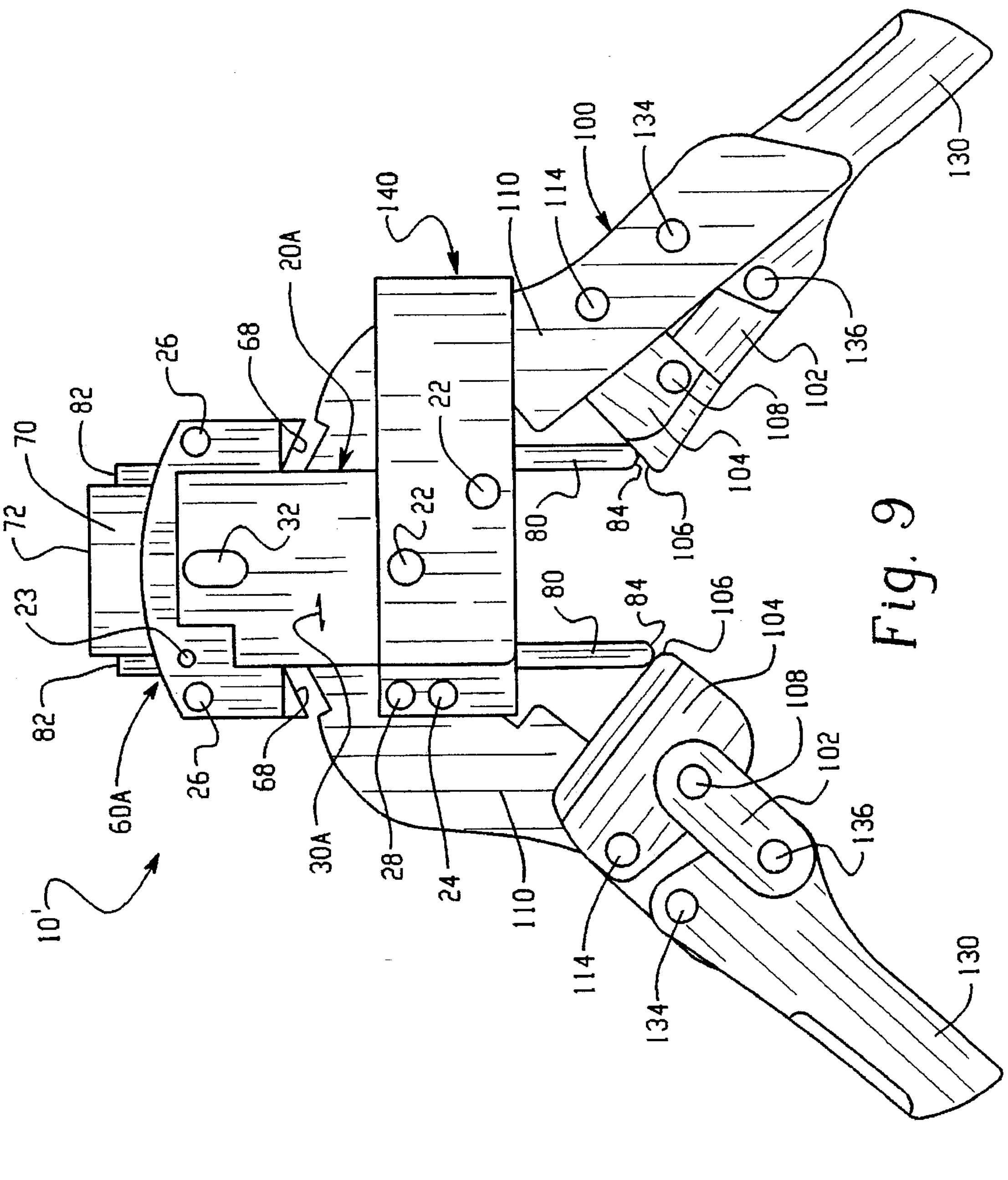
FIG. 9 is a top plan view of a spring-lock release tool illustrating another embodiment of the present invention.
Figure 10:
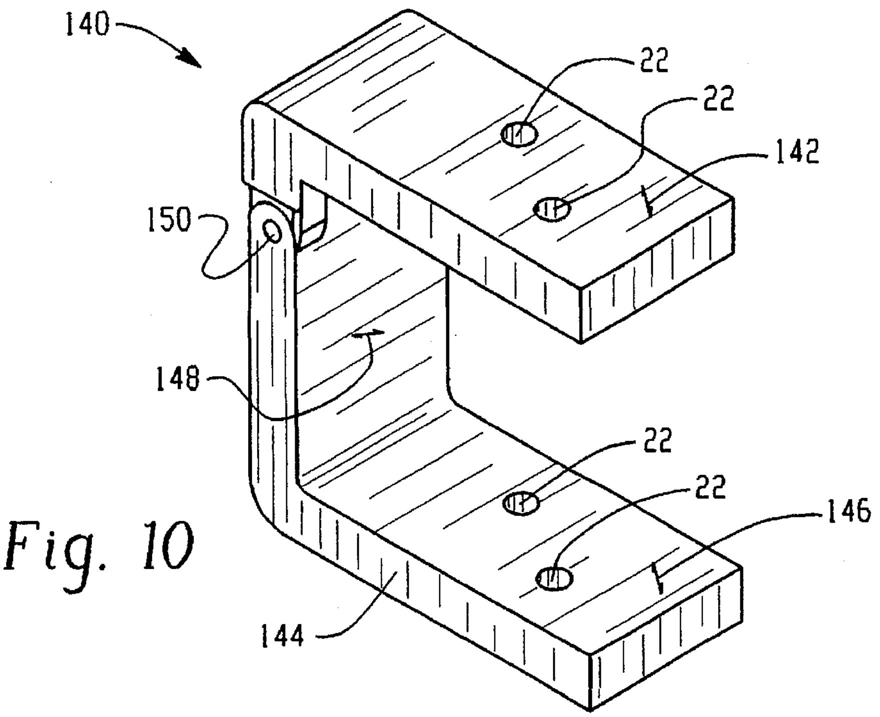
Figure 11:
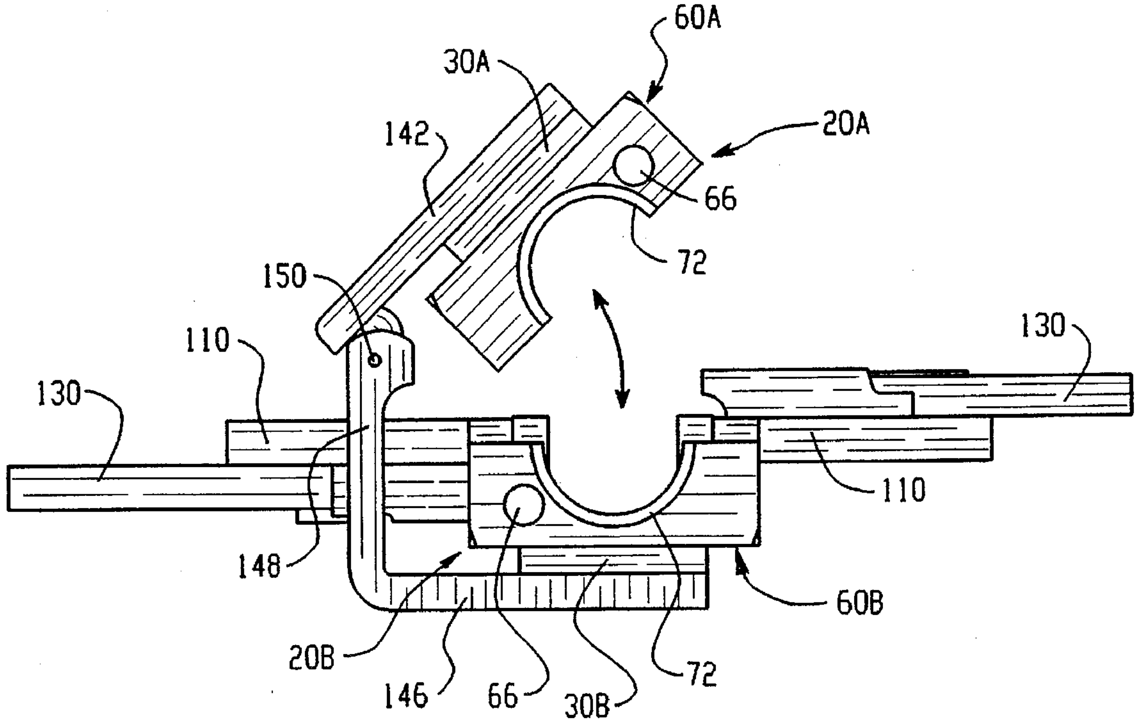
FIG. 11 is a top end view of the spring-lock release tool shown in FIG. 9.

Referring now to FIGS. 9–11, another embodiment of the present invention is shown. In this embodiment, tool 10' has upper body 20A hinged to lower body 20B. In particular, a C-shaped hinged bracket 140 (FIG. 10) attaches to both upper body 20A and lower body 20B. Hinged bracket 140 is generally comprised of a first arm 142 and a second arm 144. Second arm 144 has a horizontal portion 146 and a vertical portion 148. First arm 142 and second arm 144 are attached to each other by a hinge 150. As best seen in FIG. 11, first arm 142 is attached to upper guide plate 30A. Holes 22 formed in first arm 142 are dimensioned to receive fasteners which attach first arm 142 to upper guide plate 30A. Likewise, horizontal portion 146 of second arm 144 is attached to lower guide plate 30B. In this respect, holes 22 formed in horizontal portion 146 are dimensioned to receive fasteners for attaching second arm 144 to lower guide plate 30B. First arm 142 is movable about an axis defined by hinge 150. In FIG. 11, first arm 142 is shown in an open position. To move first arm 142 into a closed position (i.e., "locked"); it is moved towards lower body 20B. Fasteners are inserted through holes 24 and 26 to lock upper body 20A to lower body 20B.

The foregoing description is a specific embodiment of the present invention. It should be appreciated that this embodiment is described for purposes of illustration only, and that numerous alterations and modifications may be practiced by those skilled in the art without departing from the spirit and scope of the invention. For instance, the concave grooves formed in the floating collar members and the locking blocks may have various dimensions, so as to accept tubing of different sizes (e.g., 3/8-inch, 5/8-inch, 3/4-inch or 2-inch diameter tubing). Furthermore, the present invention may be constructed of a variety of materials including plastic and metal. It is intended that all such modifications and alterations be included insofar as they come within the scope of the invention as claimed or the equivalents thereof.

The invention claimed is:

1. A tool adapted for uncoupling and separating a first tube from a second tube, the first and second tubes coupled together by a retaining means having a cage member and a spring member housed therein, said tool comprising:

locking means for fixing said tool to said second tube;

first engagement means, movable relative to said locking means, for operative engagement with said spring member to uncouple said first and second tubes;

second engagement means, movable relative to said locking means, for operative engagement with said cage member to separate said first tube from said second tube; and means for moving said first engagement means into operative engagement with said spring member and moving said second engagement means into operative engagement with said cage member.

2. A tool according to claim 1, wherein said first engagement means is an annular collar member.

3. A tool according to claim 1, wherein said second engagement means is a rod means.

4. A tool according to claim 1, wherein said means for moving said first and second engagement means is movable arm means.

5. A tool adapted for uncoupling and separating a first tube from a second tube, the first and second tubes coupled together by a retaining means having a cage member and a spring member housed therein, said tool comprising:

locking means for fixing the tool to the second tube;

collar means, movable relative to said locking means, for operative engagement with said spring member to uncouple said first and second tubes;

rod means, movable relative to said locking means, for operative engagement with said cage member to separate said first tube from said second tube; and arm means movable to a first position to move said collar means into operative engagement with said spring member, and movable to a second position to move said rod means into operative engagement with said cage member, to uncouple and separate the first tube from the second tube.

6. A tool according to claim 5, wherein said collar means is slidably attached to said locking means.

7. A tool according to claim 5, wherein said arm means is pivotally attached to said locking means.

8. A tool according to claim 5, wherein said arm means includes cam means for engaging said rod means.

9. A tool according to claim 5, wherein said arm means includes engagement surfaces for engaging said collar means.

10. A tool according to claim 5, wherein said locking means is comprised of first and second locking blocks, said first locking block fixable to said second locking block to grip said second tube.

11. A tool according to claim 10, wherein said first and second locking blocks are attached by a hinge member.

12. A tool according to claim 5, wherein said collar means is comprised of first and second collar members, said first collar member fixable to said second collar member to form an annular surface engageable with said spring member.

13. A tool according to claim 5, wherein said arm means are comprised of first and second arms.

14. A tool according to claim 13, wherein said first and second arms are comprised of a primary arm member, said primary arm member engageable with said collar means to uncouple said first and second tubes.

15. A tool according to claim 14, wherein said arm means further comprises a secondary arm member and a cam means, said secondary arm member engageable with said cam means to move said cam means into engagement with said rod means, to separate said first and second tubes.

16. A tool according to claim 15, wherein said first arm and second arm are movable independent of each other.

17. A tool adapted for uncoupling and separating a first tube from a second tube, the first and second tubes coupled together by a retaining means having a cage member and a spring member housed therein, said tool comprising:

locking means for fixing the tool to the second tube;

collar means, movable relative to said locking means, for operative engagement with said spring member to uncouple said first and second tubes;

rod means, movable relative to said locking means, for operative engagement with said cage member to separate said first tube from said second tube; and pivotable arm means movable to a first position to move said collar means into operative engagement with said spring member, and movable to a second position to move said rod means into operative engagement with said cage member, to uncouple and separate the first tube from the second tube.

* * * * *